United States Patent [19]
Krause
[11] 3,736,371
[45] May 29, 1973

[54] METHOD AND ARRANGEMENT FOR REDUCING THE COLOR LINE NOISE IN THE STORAGE AND TRANSMISION OF COLOR TELEVISION SIGNALS

[75] Inventor: Gerhard Krause, Ebersberg, Munich, Germany

[73] Assignee: Robert Bosch Fernsehanlagen, GmbH, Stuttgart, Germany

[22] Filed: Sept. 18, 1970

[21] Appl. No.: 73,571

[30] Foreign Application Priority Data

Sept. 22, 1969 Germany......................P 19 47 826.3

[52] U.S. Cl.....178/5.4 CD, 178/54 SY, 179/100.2 K
[51] Int. Cl..........H04n 5/78, H04n 5/04, G11b 5/04
[58] Field of Search......................178/5.4 SY, 5.2 R, 178/6.6 A, 69.5 CB, 6.6 TC, 5.4 CD

[56] References Cited

UNITED STATES PATENTS 3,580,990 5/1971 Numakura.........................178/6.6 A
3,095,472 6/1963 Dolby et al......................178/5.4 CD

*Primary Examiner*—Robert L. Griffin
*Assistant Examiner*—John C. Martin
*Attorney*—Michael S. Striker

[57] ABSTRACT

The color synchronizing signal is derived from the color television signal before the latter is modulated onto a carrier. After modulation a signal derived from the color synchronizing signal by frequency multiplication and/or division, is added to the modulated color television signal. The derived signal can be the blanking value or the synchronizing value. Before the television signal is demodulated, the derived signal is removed, and the color synchronizing signal reobtained by a mathematical operation that is a reciprocal of the first operation.

23 Claims, 2 Drawing Figures

Inventor:
Gerhard Krause
by
[signature]
Attorney

METHOD AND ARRANGEMENT FOR REDUCING THE COLOR LINE NOISE IN THE STORAGE AND TRANSMISION OF COLOR TELEVISION SIGNALS

BACKGROUND OF THE INVENTION

The invention relates to a method for reducing the color line noise in the storage and transmission of color television signals, wherein a carrier modulated by the color television signals is stored and transmitted.

In the reproduction of stored television signals and, in some cases, also when receiving such signals, time errors are compensated by performing, among other operations, a phase comparison between the color synchronizing signal and a reference color carrier.

If in such operations undesirable statistical fluctuations are superimposed upon the color synchronizing signal then a disturbing color line noise will result.

Because the fluctuations in adjacent lines cannot be correlated, it is still not possible for the color line noise to be removed by a PAL demodulator operating in an ideal mode.

SUMMARY OF THE INVENTION

An object of the present invention is a method and an arrangement for reducing the color line noise.

The invention includes within its scope as far as possible the standards laid down for the storage of color television signals upon magnetic tape.

The method of the invention consists essentially of removing from the color television signal the color synchronizing signal and modulating a carrier only with the remaining portion of the color television signal; and storing or transmitting the color synchronizing signal without using the modulation process provided for the remaining portion of the color television signal.

The arrangement of the invention consists essentially of modulation means for the color television signal; and bypass means for removing the color synchronizing signal from the color television signal before the latter is modulated.

The advantages of the method according to the invention consist in the fact that no worsening of the signal-to-noise ratio for the color synchronizing signal will occur caused by the modulation as well as the demodulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
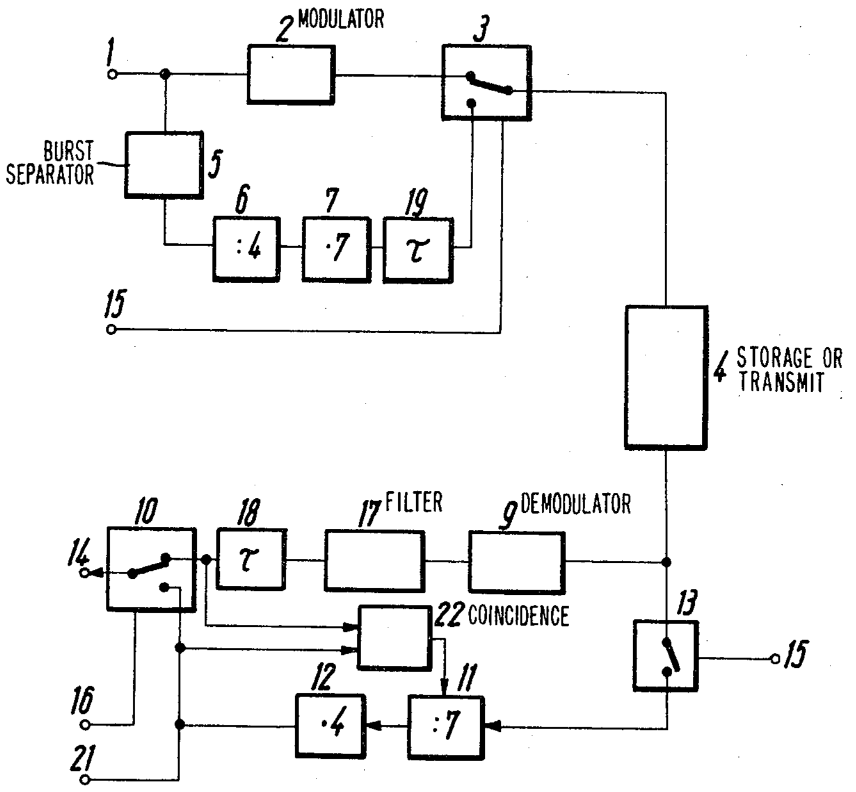
FIG. 1 is a circuit arrangement for performing the method according to the invention.

Color television signals are delivered to the circuit arrangement according to FIG. 1, and are frequency modulated with a carrier in modulator 2. The carrier frequency is then delivered through the electronic changeover switch 3 to the transmission apparatus or to the recording system 4. By means of a known type of burst separator 5, the color synchronizing signal is then separated from the color television signals and is then delivered through the frequency divider stage 6 and the frequency multiplier 7 to a further input of the electronic changeover switch 3. The frequency division and multiplication produces an additional, or derived, signal, which is added to, or blended into, the modulated part of the color television signal. The electronic changeover switch 3 is activated by pulses which are represented in line 15 of FIG. 2, and which are positioned in time between the end of the color synchronizing signal and the beginning of the picture content. These pulses are derived from horizontal frequency pulses by the use of known delay circuits and pulse former circuits, which are not shown in the drawing.

In accordance with the invention, by frequency multiplication and/or frequency division, there is derived from the color synchronizing signal, a further signal which, by suitable choice of the factors or devisors of the frequency, corresponds to that signal component of the color television signals, in place of which it is transmitted.

For example, by multiplying by seven and dividing by four, there is obtained from the color carrier frequency of $f = 4.43$ Mc/s, a frequency of 7.77 Mc/s. This frequency corresponds approximately to that which is provided by frequency modulation according to the existing standard for the blanking value. If, therefore, instead of using the original blanking value, a frequency derived as above mentioned by division and multiplication is blended into the color television signals after the modulation, there will, nevertheless, be obtained color television signals recorded in accordance with the standards, which can be reproduced both by the conventional method with the previously attained signal-to-noise ratio, as well as by application of the method according to the invention with the improved signal-to-noise ratio.

In the reproduction of the recorded signals, or upon receipt of the transmitted carrier frequency signals, these are demodulated by the demodulator 9 and are conducted through a low pass filter 17, a delay member 18 and the electronic changeover switch 10 to the output terminal 14. The additionally blended signal is separated by the aid of the electronic switch 13, which is controlled by means of pulses delivered at the point 15, which exhibit the form represented in line 15 of FIG. 2. By means of the frequency divider circuit 11 and the frequency multiplier 12 a mathematical operation is performed which is a reciprocal of that which takes place at recording. At the output of the frequency divider 12 there will then appear a short color carrier oscillation, which is blended into the color television signals by means of the switch 10.

In the circuit arrangement represented the additional, or derived, signal was transmitted during the time between the color synchronizing signal and the end of the back porch of the horizontal synchronizing pulses. It corresponds to the carrier with that degree of modulation which is provided for the storage or transmission of the components independent of the picture content. In order to be able to perform the blending by means of the switch 10 at the position of the color synchronizing signal, the color television signals are delayed by the duration of the color synchronizing signal by the aid of the delay member 18.

Figure 2:
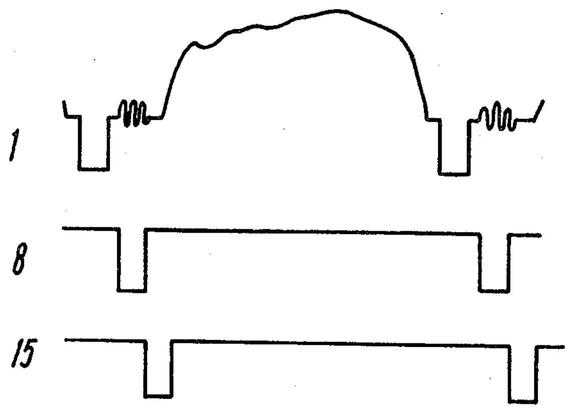
FIG. 2 shows voltage-time diagrams which apply to the circuit arrangement according to FIG. 1.

The switch 10 is controlled by the pulses which are delivered at the terminal 16 and are represented at line 15 in FIG. 2. At the output 14 of the circuit arrangement the color television signals are available, which comprise a color synchronizing signal accompanied by only a slight noise content, which, as already explained, can be taken to the phase comparison means for the purpose of reducing the time error.

Due to the fact that the transmission of the color synchronizing signal takes place in the form of an oscillation, which exhibits a higher frequency than the color synchronizing signal, and due also to the subsequent frequency division, an ambiguity exists because the frequency divider 11 cannot receive from the additionally transmitted signal any information as to the manner in which the individual oscillation trains of this signal are related in time to the color synchronizing signal.

In the circuit arrangement according to FIG. 1 this ambiguity is resolved by arranging that the color synchronizing signal, which, according to the conventional method, has been transmitted and stored, as also the color synchronizing signal which appears at the output of the frequency multiplier 12, are both delivered to a coincidence circuit 22. The coincidence circuit 22 performs the function that in the case of coarse non-coincidence of the phase positions of the two color synchronizing signals, the synchronization of the frequency divider will be temporarily interrupted, which effect repeats itself for such time until the phase positions of the color synchronizing signals coincide with each other.

In many cases, for example in the compensation of time errors in magnetic recording systems, it may be appropriate to arrange that the color synchronizing signal derived by the method according to the invention shall not be blended in to the color television signals, but shall be separately conducted to the arrangement for compensating the time errors. The terminal 21 is provided for this purpose.

The usual arrangements for compensating time errors mostly comprise two controlled delay devices, of which the one is controlled by phase comparison of the synchronizing pulses of the color television signals with a line-frequency reference signal, and the other is controlled by phase comparison of the color synchronizing signal with a reference color carrier. In the performance of the method according to the invention it may be advantageous to provide a third delay device, which exhibits only a small control range and which is controlled by the color synchronizing signal delivered at 21. In this case the coincidence circuit 22 may be omitted.

As an additional signal it is also possible to transmit a frequency which is higher than the pass frequency of the low pass filter 17, but is lower than the carrier frequency allocated of the black value or the synchronous value. This signal cannot go through the low pass filter into the demodulator. In the reproduction of such a recording with devices which are not adjusted to the method according to the invention there will nevertheless result a color television signal according to standard.

The frequency division mentioned in connection with FIG. 1 as well as the frequency multiplication is particufavorable in frequency modulation standardized for broadcasting purposes. It is possible, however, to select other division ratios. For example, a multiplication by the factor of 8 and a division by 5 will give a frequency of 7.1 Mc/s, which substantially corresponds to the value of 7.16 Mc/s provided for the synchronous value. The field of application of the method of the invention is also not restricted to frequency modulation. The method may also be applied with success in connection with other types of modulation.

The invention is not restricted to the operation of blending in a signal in place of the blanking value. The signal derived from the color synchronizing signal can also be adopted in place of the synchronizing value. Moreover, the color synchronizing signal can be replaced in the storage and transmission by a signal derived by the method according to the invention, in which case regard must be had to the fact that besides the frequency derived by multiplication and division the side band must also be keyed in.

It will be understood that each of the elements described above, or two or more together, may also find a useful application in other types of circuits differing from the types described above.

While the invention has been illustrated and described as embodied in a method and arrangement for reducing the color line noise in the storage and transmission of color television signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method for reducing the color line noise in the storage or transmission of a standard color television signal having a color synchronizing signal, comprising, in combination, separating said color synchronizing signal from said standard color television signal, thereby furnishing a derived signal; generating a carrier signal; modulating said standard television signal onto said carrier signal thereby furnishing a modulated carrier signal; and combining at least part of said modulated carrier signal with said derived signal, said step of combining including interrupting said modulated carrier signal at predetermined time instants, thereby furnishing a second television signal having a signal component corresponding to a color synchronizing signal which has bypassed said modulating step.

2. A method as set forth in claim 1, wherein said modulated carrier signal has components independent of picture content; and wherein said predetermined time instants coincide with a selected one of said components.

3. A method as set forth in claim 2, wherein said modulated carrier signal is a frequency modulated carrier signal; wherein said selected components of said frequency modulated carrier signal has a determined frequency; and wherein said step of generating said derived signal comprises separating said color synchronizing signal from said standard television signal and changing the frequency of said so-separated color synchronizing signal to a frequency substantially equal to said determined frequency.

4. A method as set forth in claim 3, wherein said selected component is the blanking level.

5. A method as set forth in claim 3, wherein said selected component is the synchronizing level.

6. A method as set forth in claim 3, wherein said step of the changing the frequency comprises frequency dividing said so-separated color synchronizing signal.

7. A method as set forth in claim 6 further comprising the step of frequency multiplying said frequency divided color synchronizing signal.

8. A method as set forth in claim 2, further comprising the step of separating said derived signal from said second television signal following said storage or transmission, thereby furnishing a separated derived signal.

9. A method as set forth in claim 8, further comprising the step of demodulating said second television signal following said separation of said derived signal.

10. A method as set forth in claim 9, further comprising the step of filtering said second television signal after said demodulation.

11. A method as set forth in claim 10, further comprising the step of time delaying said so-filtered second television signal.

12. A method as set forth in claim 11, further comprising the step of combining at least part of said second television signal following said time delay with said separated derived signal.

13. A method as set forth in claim 12, wherein combining at least part of said television signal with said separated derived signal comprises interrupting said second television signal at time instants corresponding to the transmission of the color synchronizing signal; and furnishing said derived signal at said time instance.

14. Arrangement for reducing color line noise in a color television system, comprising, in combination, means generating a standard color television signal including a color synchronizing signal; burst separator means for separating said color synchronizing signal from said standard color television signal, thereby furnishing a derived signal; modulation means connected to said means for generating a standard color television signal, for modulating said standard color television signal onto a carrier signal, thereby creating a modulated carrier signal; and combining means connected to said modulation means and said burst separator means for combining at least part of said modulated carrier signal with said derived signal, said combining means including output terminal means, and switching means alternately connecting said modulation means and said burst separator means to said output terminal under control of timing signals.

15. An arrangement as set forth in claim 14, further comprising frequency divider means interconnected between said burst separator means and said switching means.

16. An arrangement as set forth in claim 15, further comprising frequency multiplier means connected between said frequency divider means and said switching means.

17. An arrangement as set forth in claim 14, further comprising signal storage means connected to said output terminal means, said signal storage means having signal output means.

18. An arrangement as set forth in claim 17, further comprising second switching means connected to said signal output means, operative under control of said timing signals to furnish said derived signal at a second switching output.

19. An arrangement as set forth in claim 18, further comprising demodulator means connected to said signal output means for demodulating said modulated carrier signal, thereby furnishing a second standard television signal.

20. An arrangement as set forth in claim 19, further comprising filter means connected to the output of said demodulator means.

21. An arrangement as set forth in claim 20 further comprising time delay means connected to the output of said filter means.

22. An arrangement as set forth in claim 21 further comprising second combining means connected to said time delay means and said second switching output for combining at least part of said second standard television signal and said derived signal.

23. An arrangement as set forth in claim 22, wherein said second combining means comprise second output terminal means; and third switching means connecting said second switching output to said second output terminal means during the color burst time of said second standard television signal and connecting the output of said time delay means to said second output terminal means at all other times.

* * * * *